United States Patent
Cerdan

(10) Patent No.: US 11,500,343 B2
(45) Date of Patent: Nov. 15, 2022

(54) METHOD FOR CONTROLLING A HOME AUTOMATION INSTALLATION, ASSOCIATED EQUIPMENT AND INSTALLATION

(71) Applicant: FREEBOX, Paris (FR)

(72) Inventor: Sébastien Cerdan, Boulogne Billancourt (FR)

(73) Assignee: FREEBOX, Paris (FR)

( * ) Notice: Subject to any disclaimer, the term of this patent is extended or adjusted under 35 U.S.C. 154(b) by 11 days.

(21) Appl. No.: 15/899,980

(22) Filed: Feb. 20, 2018

(65) Prior Publication Data
US 2018/0239320 A1   Aug. 23, 2018

(30) Foreign Application Priority Data

Feb. 21, 2017 (FR) ........................... 1751364

(51) Int. Cl.
| | | |
|---|---|---|
| G05B 15/02 | (2006.01) | |
| G06F 9/455 | (2018.01) | |
| G06F 9/50 | (2006.01) | |
| H04L 12/28 | (2006.01) | |

(52) U.S. Cl.
CPC ......... G05B 15/02 (2013.01); G06F 9/45558 (2013.01); G06F 9/5077 (2013.01); H04L 12/2821 (2013.01); G06F 2009/4557 (2013.01); G06F 2009/45595 (2013.01); H04L 12/2818 (2013.01)

(58) Field of Classification Search
None
See application file for complete search history.

(56) References Cited

U.S. PATENT DOCUMENTS

| | | | | |
|---|---|---|---|---|
| 2011/0093902 | A1* | 4/2011 | De Los Reyes | .... H04L 12/2812 725/80 |
| 2015/0072677 | A1* | 3/2015 | Yang | ........................ H04W 4/70 455/432.3 |
| 2017/0003985 | A1* | 1/2017 | Marsanne | ........... G06F 9/44505 |

OTHER PUBLICATIONS

French Search Report for FR17 51364 dated Nov. 8, 2017 in 2 pages.
Themistoklis Bourdenas et al.: "Starfish: policy drive self-management in wireless sensor networks", Proceedings of the 2010 ICSE Workshop on Software Engineering for Adaptive and Self-Management Systems, SEAM '10, May 3, 2010, pp. 75-83, XP55421787, New York, NY, USA.

(Continued)

*Primary Examiner* — Sean Shechtman
(74) *Attorney, Agent, or Firm* — Knobbe, Martens, Olson & Bear, LLP

(57) ABSTRACT

A method is for controlling a home automation installation. The installation includes pieces of home automation equipment and a central control member. The method includes providing a desired operation of the installation, providing a first operation of each piece of equipment, optimizing the operation of the installation by modifying the first operation of at least one piece of equipment, to obtain a second operation of the at least one piece of equipment, and an operation of the installation according to the desired operation, and installing a virtual machine in the at least one piece of equipment. The virtual machine is able to impose the second operation on the at least one piece of equipment.

5 Claims, 1 Drawing Sheet

(56) References Cited

OTHER PUBLICATIONS

Rene Muller et al.: "A virtual machine for sensor networks", Operating System Review, ACM, New York, NY, US, vol. 41, No. 3, Mar. 21, 2007, pp. 145-158, XP058271752, ISSN: 0163-5980, DOI: 10.1145/1272998.1273013.
Niels Brouwers: "A Java Compatible Virtual Machine for Wireless Sensor Networks", master Thesis, Delft University of Technology, The Netherlands, May 13, 2009, pp. 1-65, XP055422962, Internet Extract: URL:http://repository.tudelft.nl/islandora/object/uuid:d9ecf443-8e68-49bb-8f76-77760a7d2d57/datastream/OBJ/download.
Levis P. Culler D: "Mate: a tiny virtual machine for sensor networks", Operating Systems Review, ACM, New York, NY, USA, vol. 36, No. 5, Oct. 5, 2002, pp. 85-95, XP002542281, ISSN:0163-5980, DOI: 10.1145/635508.605407.

\* cited by examiner

METHOD FOR CONTROLLING A HOME AUTOMATION INSTALLATION, ASSOCIATED EQUIPMENT AND INSTALLATION This patent application claims the benefit of document FR 17/51364 filed on Feb. 21, 2017 which is hereby incorporated by reference.

FIELD OF THE INVENTION

The present invention relates to a method for controlling a home automation installation. The present invention also relates to a piece of home automation equipment and a home automation installation.

BACKGROUND OF THE INVENTION

In the field of home automation, the control of a plurality of pieces of equipment within the habitat is centralized. The entry gate, the lights or the radiators are typical examples of the plurality of pieces of equipment.

The central control makes it possible to customize the command of each of the pieces of equipment, which would be tedious to do locally.

Typically, the control is provided by a central member benefiting from access to a global network.

However, such control is vulnerable to malfunctions of the central member. In fact, a failure of the central member prevents the operation of the plurality of pieces of equipment, which can prove bothersome for the use of certain pieces of equipment, such as the entry gateway.

SUMMARY OF THE INVENTION

There is therefore a need for a method for controlling a home automation installation having fewer operating anomalies.

To that end, proposed is a method for controlling a home automation installation, the installation including pieces of home automation equipment and a central control member, the method including a step for providing a desired operation of the installation, a step for providing a first operation of each piece of equipment, a step for optimizing the operation of the installation by modifying the first operation of at least one piece of equipment, to obtain a second operation of said at least one piece of equipment, and an operation of the installation (according to the desired operation, and a step for installing a virtual machine in said at least one piece of equipment, the virtual machine being able to impose the second operation on said at least one piece of equipment.

According to specific embodiments, the control method comprises one or more of the following features, considered alone or according to any technically possible combination:
the optimization and installation steps are carried out for all of the pieces of equipment.
the second operation is different from the first operation.
the second operation is a set of second rules, one of the second rules being to impose communication exchanges between a piece of equipment and another piece of equipment.
the first operation is a set of first rules and the second operation is a set of second rules, the second rules comprising the first rules.
the second operation is a set of second rules, one of the second rules being to impose communication exchanges between a piece of equipment and another piece of equipment.
the second operation is a set of second rules, one of the second rules being the implementation of an action when a criterion is met, the criterion involving data from at least two pieces of equipment.
the method includes a step for sending the second operation by radiocommunication.

Also proposed is a piece of home automation equipment including a controller able to impose a first operation of the equipment and a virtual machine able to impose a second operation of the equipment, the second operation being separate from the first operation.

Also proposed is a home automation installation including a central control member and pieces of home automation equipment, at least one piece of equipment being as previously described.

BRIEF DESCRIPTION OF THE DRAWINGS

Other features and advantages of the invention will appear upon reading the following description of embodiments of the invention, provided as an example only and in reference to the drawings, which are.

DETAILED DESCRIPTION OF THE PREFERRED EMBODIMENTS

Figure 1:
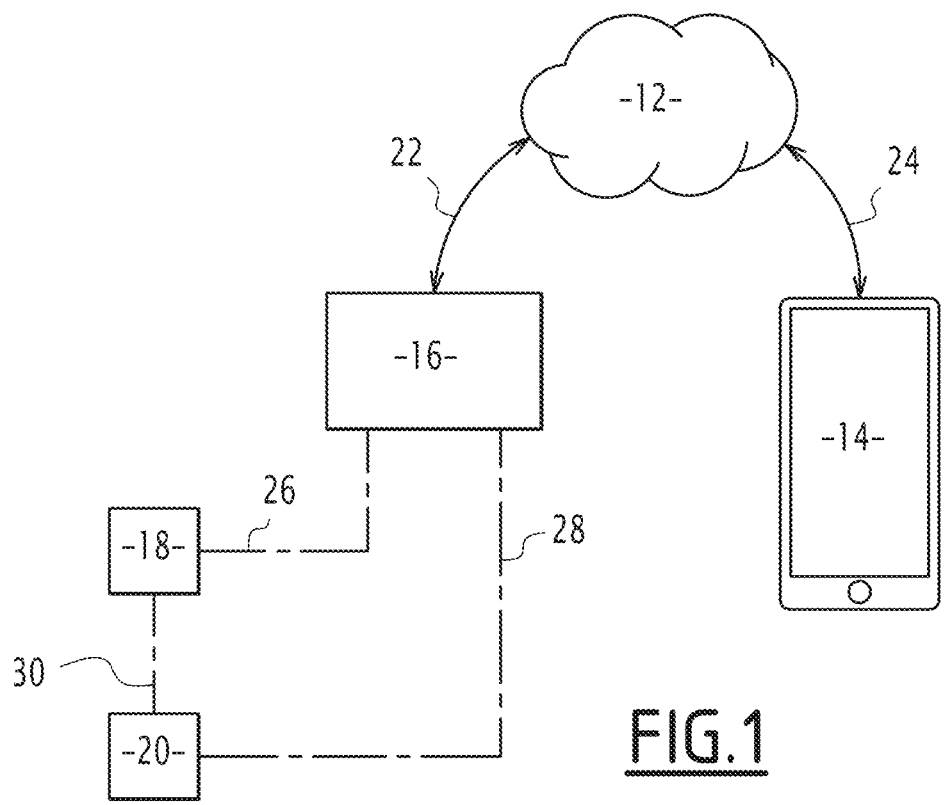
FIG. 1, a schematic view of a home automation installation including first and second pieces of a automation equipment.

A home automation installation 10, a communication network 12 and a tablet 14 are shown in FIG. 1.

The home automation installation 10 is simply denoted installation 10 in the rest of the description.

According to the illustrated example, the installation 10 includes a central control member 16 and pieces of home automation equipment 18 and 20.

In the context of this application, home automation refers to the set of techniques making it possible to centralize the control of the various systems and subsystems of a residence. The heating, rolling blinds, entrance gate or lights are examples of such systems.

The expression "communicating residence" is also used to refer to such a set of techniques.

The installation 10 allows a user to control the environment. More specifically, the installation 10 allows the user to use each piece of equipment present in the environment to control its parameters, such as the temperature or brightness.

The environment is a room or a set of rooms forming premises. The intended use of the premises (personal or business) is irrelevant in the context of this description.

In the described example, the installation 10 is a set of pieces of equipment cooperating with one another so that a user can, through the tablet 14, control each piece of equipment in a centralized manner.

The installation 10 of FIG. 1 is thus able to communicate with the communication network 12 and with the user through a tablet 14.

The communication exchanges between the installation 10 and the communication network 12 are symbolized by a solid line 22 in FIG. 1 and the exchanges between the tablet 14 and the communication network 12 are shown in the form of a solid line 24 in FIG. 1.

According to the proposed example, the communication network 12 is a global network.

The Internet is one example of a global network.

The communication network 12 allows access to sites.

The tablet 14 is a tool allowing the user to enter data in the communication network 12.

A tablet is an ultra-flat portable computer that assumes the form of a touchscreen with no keyboard and that offers approximately the same functionalities as a personal computer.

Alternatively, a keyboard and a computer monitor are used in place of the tablet 14.

According to one alternative, a remote control is used in place of the tablet 14.

The central control member 16 is called central member 16 in the continuation of the description.

The central member 16 is able to communicate with the first piece of home automation equipment 18, as indicated by the mixed lines 26 in FIG. 1.

The central member 16 is also able to communicate with the second piece of home automation equipment 20. The communication exchanges between the central member 16 and the second piece of home automation equipment 20 are in particular illustrated by the mixed lines 28 in FIG. 1.

The central member 16 is for example a unit for connecting to the Internet.

The central member 16 is able to communicate with the communication network 12.

The central member 16 is thus a gateway making it possible to connect a local network formed by the pieces of home automation equipment 18 and 20 and the central member 16 and the communication network 12.

A piece of home automation equipment is hardware interacting with the environment.

A piece of home automation equivalent is sometimes called "object".

A piece of home automation equipment is for example an actuator or a sensor.

An actuator converts the energy supplied to it into work. For example, an electromechanical device or a jack are actuators.

By extension, a device provided with a relay or a member having the same function making it possible to activate another piece of equipment is considered an actuator.

A sensor makes it possible to measure a property.

For example, the sensor is a brightness sensor, a temperature sensor, a force sensor, a speed sensor, a movement sensor or a presence sensor.

In the following example, as a non-limiting example, the two pieces of equipment 18 and 20 are sensors.

The pieces of home automation equipment 18 and 20 are able to communicate with one another autonomously and reprogrammably.

A piece of home automation equivalent is sometimes also called "connected object".

It is thus assumed hereinafter that the pieces of home automation equipment are able to communicate according to a protocol providing communication without an intermediary between the pieces of home automation equipment.

More specifically, the protocol allows the exchange of messages at the application level between two pieces of home automation equipment without passing through the central member 16.

The exchange of such messages is symbolized by mixed lines 30 in FIG. 1.

The protocol is for example a protocol suitable for an ad hoc network.

Figure 2:
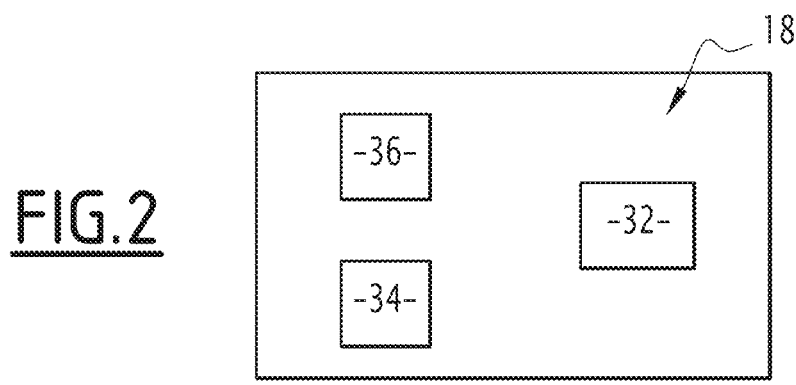
FIG. 2 is a schematic illustration of a first piece of home automation equipment of the installation of FIG. 1.

The first piece of home automation equipment 18 is shown in more detail in FIG. 2.

The first piece of home automation equipment 18 includes a first sensor 32, a first controller 34 and a first virtual machine 36.

The first sensor 32 is a sensor for measuring the brightness of the environment.

The first controller 34 is typically described as "microcontroller".

The first controller 34 is able to impose a first operation of the first piece of home automation equipment 18.

The expression "operation" refers to a set of rules.

The rules determine both the usual operation of the first piece of home automation equipment 18 (nominal rules) and the behavior of the first piece of home automation equipment 18 in case of anomalies (safety rules).

For example, a nominal rule for the first sensor 32 is to send the value of the instantaneous brightness to the first controller 34.

In contrast, a safety rule is to stop carrying out the measures if the supply voltage applied to the first sensor 32 is above a certain value.

The first operation is called "basic operation" in the rest of the description and the rules that are part of the first operation are called first rules.

The first virtual machine 36 is able to impose a second operation of the first piece of home automation equipment 18.

It should be noted that the first virtual machine 36 and the first controller 34 run on a single electronic circuit, the first virtual machine 36 being on part of a memory of the first controller 34.

Indeed, in computers, a virtual machine is software simulating the presence of hardware and software resources to run software instructions under the same conditions as if these hardware and software resources were actually present.

Like for the first operation, the second operation is a set of rules.

The second operation is called "emulated operation" in the rest of the description and the rules that are part of the second operation are called second rules.

The emulated operation of the first piece of home automation equipment 18 is separate from the basic operation of the first piece of home automation equipment 18.

This means that there is at least one emulated operation rule that is different from a basic operation rule. For example, the emulated operation includes one rule more than the basic operation.

Figure 3:
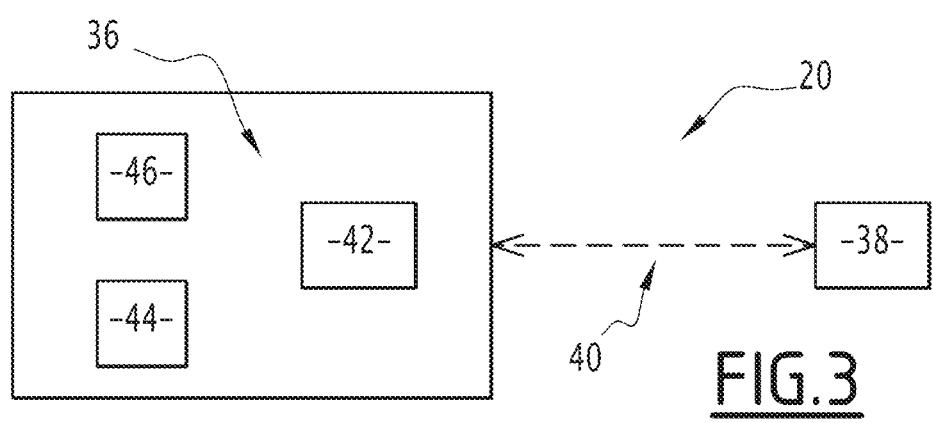
FIG. 3 is a schematic illustration of a second piece of home automation equipment of the installation of FIG. 1.

The second piece of home automation equipment 20 is shown in more detail in FIG. 3.

The second piece of home automation equipment 20 includes a second sensor 36 including two parts.

The first part 38 is able to interact, as shown by the dotted line 40, with the second part 42.

In the proposed example, the second sensor 36 is a presence sensor.

The first part 38 is a laser transmitter, while the second part 42 is a photodiode.

The second piece of home automation equipment 20 also includes a second controller 44 and a second virtual machine 46.

The same remarks as for the first controller 34 also apply for the second controller 44. Similarly, the same remarks as for the first virtual machine 36 also apply for the second virtual machine 46. These remarks are not repeated below.

Thus, the second controller 44 is able to impose a basic operation on the second piece of home automation equipment 20, while the second virtual machine 46 is able to impose an optimized operation on the second piece of home automation equipment 20.

The operation of the installation 10 is now described in reference to a method for controlling the installation 10.

The control method of the installation 10 includes an initialization phase and an operating phase.

The initialization phase is described first.

According to the proposed example, the initialization phase of the control method includes five steps: a first supply step, a second supply step, an optimization step, a sending step and an installation step.

During the first supply step, the user enters information into the central member 16 via the tablet 14.

The set of entered information is a set of rules defining a desired operation of the installation 10.

In some cases, the set of rules relative to the installation 10 is described as "operating scenarios" inasmuch as each rule does not impose how the operation of the installation 10 is carried out.

According to the described example, the user interacts with the installation 10 via a service accessible via the communication network 12.

Alternatively, the interaction is obtained by using an application present on the tablet 14.

In other embodiments, the application or service is hosted by the central member 16.

Subsequently, it is assumed that the operation of the installation 10 desired by the user is as follows: the light must activate when the brightness is low and the passage of a person is detected.

During the second supply step, the central member 16 collects the basic operation of each piece of home automation equipment 18 and 20.

For example, the first controller 34 sends the central member 16 rules by radio communication. The set of rules sent is the basic operation of the first piece of home automation equipment 18.

Similarly, the second controller 44 sends rules to the central member 16 by radiocommunication, the set of which forms the basic operation of the second piece of home automation equipment 20.

Alternatively, the communications are done using a wired link or an infrared link.

During the optimization step, the operation of the installation 10 is optimized.

The optimization is done under the constraint that the operation of the installation 10 is according to the desired operation of the installation 10.

The optimization variables are the operation of at least one of the pieces of home automation equipment 18 and 20 and the central member 16, i.e., the rules applied at least by one of the pieces of home automation equipment 18 and 20 and the central member 16.

According to the proposed example, the optimization variables are the operations of all of the pieces of home automation equipment 18 and 20 of the installation 10 and the central member 16. In other words, the variables are the set of rules applied by one from among the pieces of home automation equipment 18 and 20 and the central member 16.

The optimization is for example carried out using an optimization function applied on a starting point.

A starting point is imposing that the operation of each piece of home automation equipment 18 and 20 is the basic operation supplied in the second supply step and that the operation of the central member 16 allows the installation 10 to carry out the desired operation.

In the described example, the first home automation element 18 communicates each change of brightness throughout the day to the central member 16. The second home automation element 20 communicates each passage of a person to the central member 16. The central member 16 decides to activate the lighting according to the operation desired by the user when the condition of low lighting and the passage of a person is verified.

In general, the optimization function makes it possible to modify the basic operation of at least one piece of equipment, to obtain an optimized operation of said at least one piece of home automation equipment.

In the proposed example, the optimization function makes it possible to obtain two optimized operations: an optimized operation for the first piece of home automation equipment 18 and an optimized operation for the second piece of home automation equipment 20.

The optimized operation is separate from the basic operation.

For example, one of the second rules is to impose communication exchanges between one piece of equipment 18, 20 and another piece of equipment 18, 20.

Advantageously, the second rules comprise the first rules. This makes it possible to retain the certification and safety of the basic operation of the piece of equipment 18 and 20.

Alternatively or additionally, one of the second rules is to impose the obtainment of data from another piece of equipment 18 and 20.

Alternatively or additionally, one of the second rules is the implementation of an action when a criterion is met, the criterion involving data from at least two pieces of home automation equipment 18 and 20.

In the described example, an optimized operation rule of the first home automation element 18 is that the first home automation element 18 communicates only when the threshold set by the user is exceeded.

Furthermore, a second rule is that the second home automation element 20 communicates only when the condition (low light and passage of a person) set by the user is met.

Another rule is that the second home automation element 20 then communicates an illumination or extinction order to the central member 16.

During the sending step, the optimized operation is sent by radiocommunication from the central member 16 to each piece of home automation equipment 18 and 20 whose operation has been optimized.

For example, the sending step is carried out by sending bytecode. A bytecode is an intermediary code between the machine instructions and the source code, which is not directly executable, but which is executable by a virtual machine. The byte code can be created on the fly and live in memory or live in a file, generally binary, that represents the program, just like an object code file produced by a compiler.

During the installation step, a virtual machine is installed in each piece of equipment whose operation has been optimized.

The installed virtual machine is able to impose the second operation on said at least one piece of equipment.

According to the proposed example, the first virtual machine 36 and the second virtual machine 46 are respectively installed in the first piece of home automation equipment 18 and the second piece of home automation equipment 20.

The installation 10 is now ready to operate, each piece of home automation equipment 18 and 20 having been programmed to apply the operation rules of the installation 10 that concerns them.

The operating phase is then carried out.

As previously explained, the first home automation element 18 communicates only when the brightness threshold set by the user is exceeded.

The second home automation element 20 communicates only when the condition (low light and passage of a person) set by the user is met.

Then, the second home automation element 20 communicates an illumination or extinction order to the central member 16 for the lighting.

The method thus makes it possible to offload part of the intelligence of a home automation scenario into the pieces of home automation equipment 18 and 20.

More specifically, certain interactions between the pieces of home automation equipment 18 and 20 involve, in the state of the art, an intervention by a central member 16. The interactions are handled directly at the home automation equipment 18 and 20.

This makes it possible to avoid dependency on the proper operation of the central member 16. As a result, the home automation installation 10 has fewer operating anomalies.

In the proposed example, the lighting operates even if the central member 16 does not have access to the communication network 12.

If the central member 16 is unable to operate, the lighting also continues to operate. In fact, the lighting operates independently of the operating state of the central member.

Furthermore, the number of exchanges with the central member 16 is decreased, which decreases the electromagnetic pollution.

Furthermore, the number of messages exchanged is decreased, which makes it possible to consume less at each piece of home automation equipment.

The method remains transparent for the user, who configures the scenario of the installation 10 in a centralized manner and not on each piece of home automation equipment, which would be tedious.

Furthermore, the method makes it possible to retain a flexible and upgradable installation 10. In fact, the optimization and reprogramming of the pieces of home automation equipment 18 and 20 are controlled by the central member 16 and involve only a small amount of bandwidth.

Furthermore, the basic operation of each piece of equipment 18 and 20 is retained, which makes it possible to respect the regulations.

Furthermore, the use of a virtual machine 36, 46 enhances security, since this provides additional software protection that is not typically present.

Virtualization also makes it possible to limit and control access to certain hardware resources of the equipment 18, 20. For example, virtualization also serves to prevent the use of unregulated radio bands or to prevent behavior that would deplete the batteries very quickly.

It should also be noted that the method has the advantage of being compatible with most commercially available pieces of home automation equipment.

More specifically, the use of a virtual machine 36, 46 makes it possible to ignore the type of controller 34, 44 used. The method can therefore be deployed on controllers 34, 44 from various manufacturers, without needing to send rules in the form of specific code to the controller 34, 44 used. The method thus allows the designers of pieces of equipment 18, 20 the freedom to use the electronic components of their choice.

Furthermore, the method is compatible with the various possible configurations of the installation 10. In particular, the type of link between the central control member 16 and the pieces of home automation equipment 18, and 20, and between the pieces of home automation equipment 18 and 20, is unimportant. The method applies to both wired links and wireless links. A cabled link or a power-line communication (PLC) link are examples of wired links. It is also possible to use the method for links of different types depending on the considered components. For example, the method is compatible with a PLC link between the central control member 16 and the pieces of home automation equipment 18 and 20 and a wireless link between the pieces of home automation equipment 18 and 20.

The invention relates to the combination of all technically possible embodiments.

The invention claimed is:

1. A method for controlling a home automation installation, the installation including first and second pieces of home automation equipment and a central controller comprising a gateway to an external communication network, wherein the first and second pieces of home automation equipment are selected from the group consisting of an actuator that converts energy into work and a sensor configured to measure a property, the first and second pieces of home automation equipment comprising a first and a second controller, respectively, and a first and second virtual machine, respectively, the method comprising:

entering a first set of rules defining a desired operation of the installation into the central controller, sending a second set of rules defining a basic operation of the first piece of home automation equipment from the controller of the first piece of home automation equipment to the central controller and sending a third set of rules defining a basic operation of the second piece of home automation equipment from the controller of the second piece of home automation equipment to the central controller, optimizing the operation of the installation by modifying the basic operation of the first piece of home automation equipment, to obtain an optimized operation of said first piece of home automation equipment, and optimizing the operation of the installation by modifying the basic operation of the second piece of home automation equipment, to obtain an optimized operation of said second piece of home automation equipment, sending the optimized operation of the first piece of automation equipment from the central controller to the first piece of home automation equipment and sending the optimized operation of the second piece of automation equipment from the central controller to the second piece of home automation equipment, installing the first virtual machine in said first piece of home automation equipment, the first virtual machine imposing the optimized operation on said first piece of home automation equipment and installing the second virtual machine in said second piece of home automation equipment, the second virtual machine imposing the optimized operation on said second piece of home automation equipment, imposing direct communication exchanges between the first piece of home automation equipment and the second piece of home automation equipment without passing through the central gateway or other intermediary, and operating the installation according to the optimized operation of the first and second optimized operations, said operating comprising implementing an action when a criterion is met without requiring access of the central controller to the external communication network, the criterion involving data from said first and second pieces of home automation equipment obtained from said communication exchanges.

2. The method according to claim 1, wherein the optimization and installation steps are carried out for all of the pieces of home automation equipment.

3. The method according to claim 1, wherein the optimized operation is separate from the basic operation.

4. The method according to claim 1, wherein the basic operation is a set of first rules and the optimized operation is a set of second rules, the second rules comprising the first rules.

5. The method according to claim 1, wherein the method includes a step for sending the optimized operation by radiocommunication.

* * * * *